United States Patent [19]

DiBenedetto et al.

[11] 3,841,390

[45] Oct. 15, 1974

[54] CONTINUOUS MOLDING MACHINE

[76] Inventors: Frank DiBenedetto, 7 Pasco Dr.;
Louis A. Viscolosi, Jr., 5 Pasco Dr., both of Johnston, R.I. 02919

[22] Filed: Jan. 29, 1973

[21] Appl. No.: 327,305

[52] U.S. Cl. ................ 164/329, 164/278, 425/371, 164/327
[51] Int. Cl. ............................................. B22d 5/04
[58] Field of Search .......... 164/329, 330, 324, 278, 164/279, 280, 87, 276, 324, 326, 129, 130, 331, 327, 328; 425/371

[56] References Cited
UNITED STATES PATENTS

| | | | |
|---|---|---|---|
| 1,246,549 | 11/1917 | Clegg et al. | 164/279 |
| 1,319,673 | 10/1919 | Stephenson | 164/330 X |
| 3,454,984 | 7/1969 | Alberts | 164/278 X |

FOREIGN PATENTS OR APPLICATIONS

| | | | |
|---|---|---|---|
| 201,079 | 8/1908 | Germany | 164/324 |
| 201,080 | 8/1908 | Germany | 164/324 |

*Primary Examiner*—J. Spencer Overholser
*Assistant Examiner*—V. K. Rising
*Attorney, Agent, or Firm*—Barlow & Barlow

[57] ABSTRACT

A continuous molding machine having a stand with a top platform. Mounted on the top platform is a stationary plate in which a first pair of laterally spaced vertical shafts are rotatably supported. A laterally adjustable plate is also mounted on the top platform and it has a second pair of laterally spaced vertical shafts rotatably supported thereon. Adjustable pressure plate structure is mounted on the top platform to vary the lateral spacing between the stationary plate and the adjustable plate. Sprocket gears are mounted on each of the shafts and separate chains pass around the sprocket gears on the first and second pair of laterally spaced shafts. Secured to the outer surface of these chains are a plurality of pressure plates. Closed loop belts made of a flexible material such as vulcanized rubber pass around the pressure plates on the respective chains and they have a plurality of mold cavities in their outer faces. The mold cavities have sprue cavities extending upwardly to the top of the belts and the individual sprue cavities are connected together by a runner cavity so that the articles being cast are connected together in one continuous piece of molded material. A cover encloses the first and second closed loop conveyors and it has a window in one of its walls for observing and monitoring the molding operation.

2 Claims, 7 Drawing Figures

PATENTED OCT 15 1974 3,841,390

CONTINUOUS MOLDING MACHINE

BACKGROUND OF THE INVENTION

This invention generally relates to a machine for continuously molding articles and more specifically to one capable of casting molten material in a fluid state and ejecting the individually cast articles from the mold as a continuous piece of molded material. In the past continuous molding machines have been known having closed loop belts with mold cavities on their outer surfaces. These belts, however, were made from a plurality of metallic mold sections that were linked together by the chains to which they are attached. These chains also passed around a pair of laterally spaced sprocket gears.

Most of the previous continuous molding machines were utilized with a powdery or granular material which was fed between a pair of vertically oriented closed loop conveyor belts. In these machines after the material had been molded together between the belts it discharged from the bottom of the machine as individually molded pieces. These type of machines were not suitable to the operation of casting metallic molded pieces. A machine that allows granular materials to be compacted between rotating opposite halves of the mold is completely unworkable where a molten metal is being cast.

The use of a vulcanized rubber closed loop belt in a continuous casting machine has not been known previously and the normal practice is to use a closed loop belt made of a plurality of metallic mold sections. Previous continuous casting machines also had been known that utilized a metallic mold ring having mold cavities in its outer surface that mated with mold cavities on mold blocks carried by a chain passing around a sprocket gear such as illustrated in U.S. Pat. 2,458,410. These castings had their closed loop members rotating around horizontally positioned shafts. Additionally when the closed loop belt was made of metallic mold sections, intricately designed metallic articles could not be molded because of the inability of the mold section to be flexed in order to remove the molded piece. Also previous casting machines required special structure to remove the molded articles from the mold cavities as the machine continued to run.

SUMMARY OF THE INVENTION

This continuous casting machine is designed to cast multiple pieces in a continuous process. This is accomplished by a pair of closed loop belts each having a plurality of mold cavities formed in their outer faces which are pressed into mating relationship as they travel along a predetermined length. The mold cavities on the loop belts are connected to a plurality of sprue cavities that extend upwardly to the top of the belts and these sprue cavities are in turn connected to each other by runner cavities. Thus as the belts come into surface engagement molten metal is poured into the sprues to fill the mold cavities and also allow additional molten metal to run through the runner cavities thereby allowing multiple pieces to be cast in a continuous piece of molded material. The loop belts may be advancing continuously or may be indexed beneath the pouring chute through which the melted metal is delivered to the sprue cavities. As the belts continue to travel along, the molten metal will solidify before it reaches the point where the molds separate and travel away from each other. As the molds are opened, the pieces of material cast in the mold are carried outwardly from the mold by the cast runner which connects each of the molded pieces. An auxiliary unit is utilized to punch or knock off the molded pieces into a hopper or container beneath the cast runner as it travels towards a scrap bin.

DESCRIPTION OF THE PREFERRED EMBODIMENT

Figure 1:
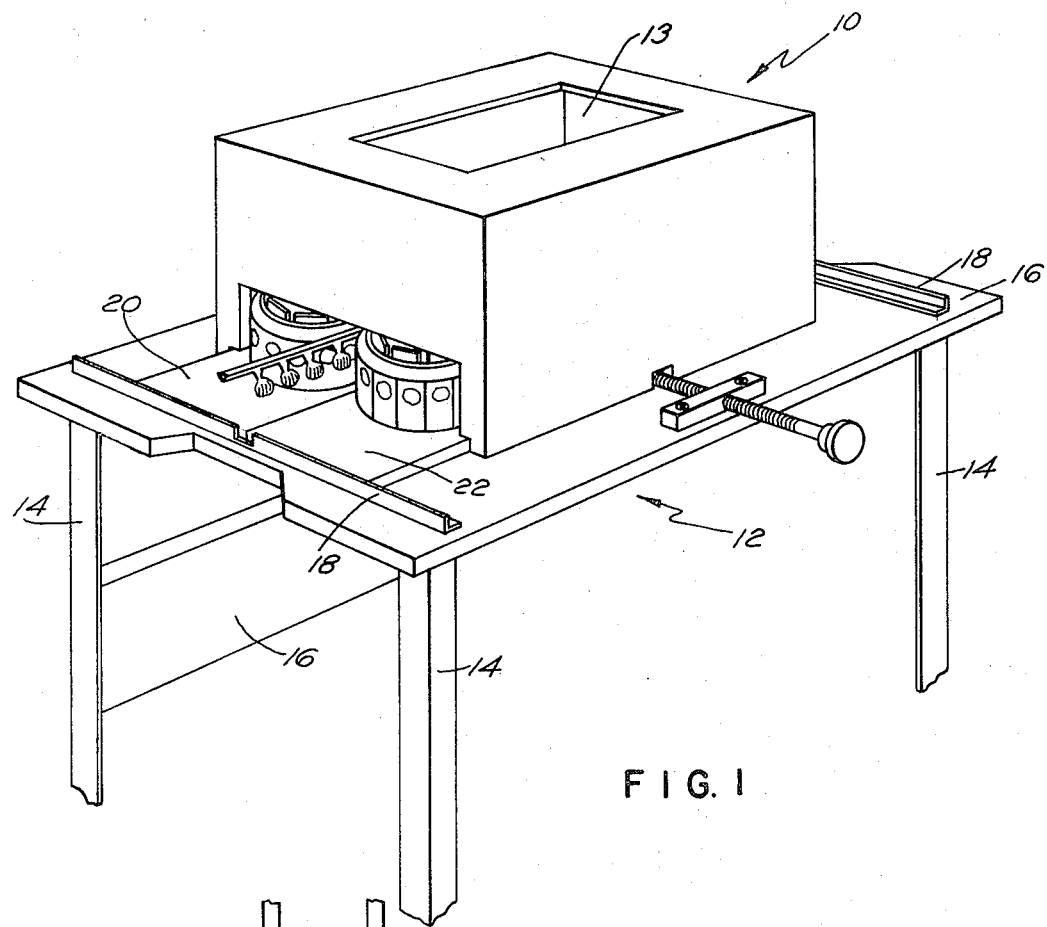
FIG. 1 is a perspective view of the novel continuous casting machine.

Referring to FIG. 1 numeral 10 generally designates the novel continuous casting machine. It is comprised of a stand 12 that is formed by legs 14 and top platform 16. Connecting two of the legs 14 is a cross member 16 upon which is mounted a motor (not shown) which drives the machine. Located on top of platform 16 are a pair of guide rails 18 at opposite ends of the platform. Stationary plate 20 has its opposite ends seated between the guide rails and it is fixedly secured to top platform 16. Adjustable plate 22 also has its opposite ends seated between guide rails 18 but it is not secured to top platform 16.

Figure 2:
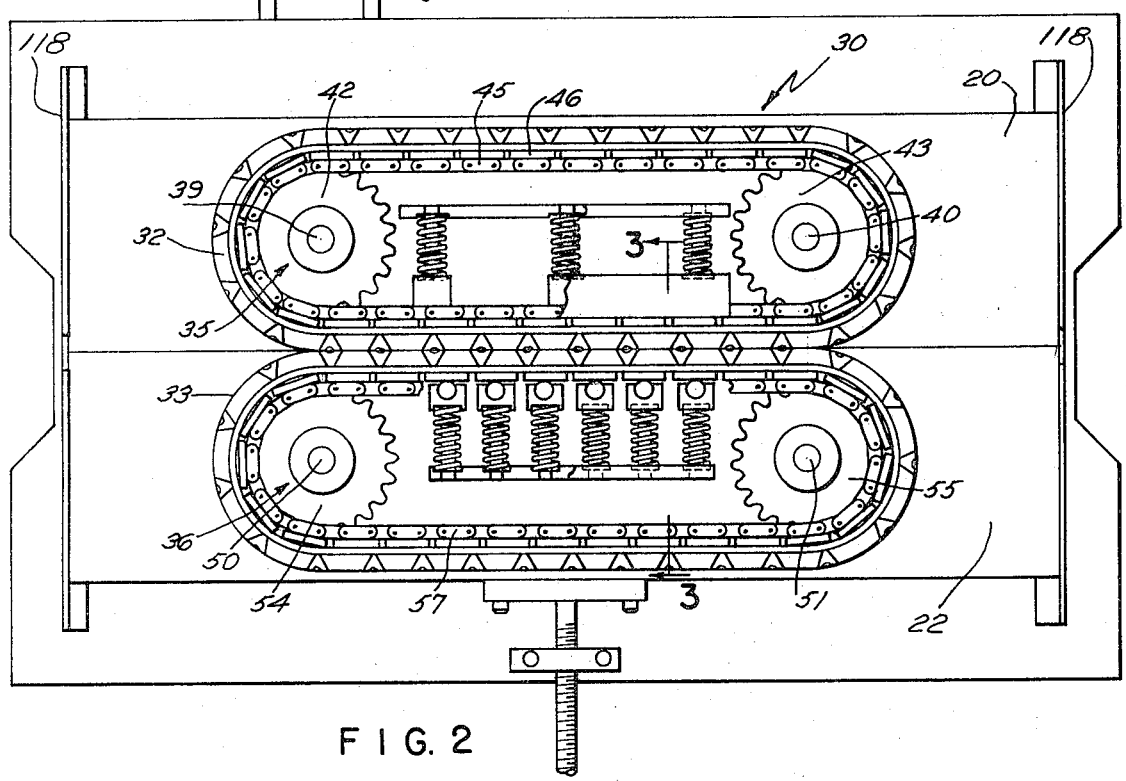
FIG. 2 is a top plan view of the continuous casting machine with the cover and pouring chute removed.

The basic casting unit 30 which is mounted on stationary plate 20 and adjustable plate 22 is best illustrated in FIG. 2. It consists of a pair of closed loop belts 32 and 33 that pass around conveyor unit 35 and 36 respectively. Conveyor unit 35 is comprised of shaft 39 and 40 which are laterally spaced and rotatably supported on stationary plate 20. Mounted on the shafts are sprocket gears 42 and 43 respectively. A closed loop chain 45 passes around these sprocket gears and it has secured on its outer faces a plurality of platens 47. (See FIG. 3). Laterally spaced shafts 50 and 51 are rotatably supported on adjustable plate 22. These shafts have sprocket gears 54 and 55 respectively mounted thereon and a chain 57 passes around these gears.

Figure 4:
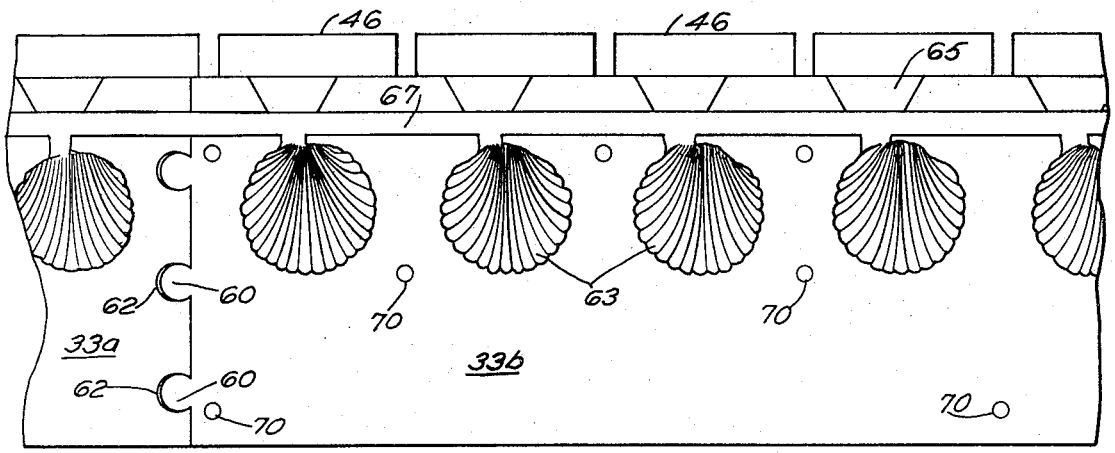
FIG. 4 is a partial elevation view of one of the closed loop belts.

Closed loop belts 32 and 33 are made from a flexible material such as vulcanized rubber. They may be made in a plurality of sections and it will be seen in FIG. 4 that belt 33 is made of individual sections 33a and 33b. These sections have protrusions 60 at one of their ends that mate with recesses 62 of the adjoining sections. It will be easily understood that by using a sectionalized belt the individual sections may have mold cavities to produce differently shaped cast pieces. Belt 33 is illustrated as having mold cavities 63 embedded in its outer surface. At the top of these cavities a sprue cavity 65 runs all the way to the top of the belt. A runner cavity 67 then connects each of these along the length of the belt. Belt 32 could have a flat surface or mold cavities embedded therein or a male mold structure that would protrude outwardly from the surface of the belt depending on the shape of the workpiece to be molded. A plurality of timing pins 70 protrude from belt 33 and these would mate with recesses in belt 32 to assure proper alignment of the two belts together while forming the cast pieces. The utilization of rubber belts allows pieces to be cast having undercuts which normally cannot be done with continuous casting machines having metal belts. The manner of forming the mold cavities in the individual sections of the belt is very simple and requires only that the designs to be cast have their opposite faces embedded into the belt sections while in a softened condition to make a good cavity impression after which the belt sections are vulcanized to permanently set the mold cavity in the belt.

Figure 3:
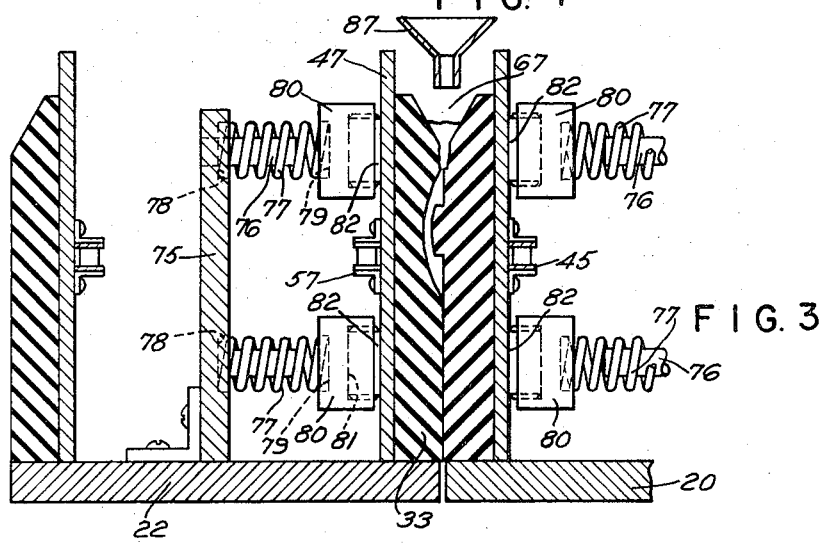
FIG. 3 is a cross section taken along lines 3—3 of FIG. 2.

It is very important that belts 32 and 33 as they come into engagement are firmly pressed together as the molten metal is poured into the mold cavities. To insure that these belts are held in constant contact during the casting operation, it is necessary that platens 47 have constant pressure applied to their rear surfaces during the casting operation. Referring to FIG. 3 the structure to produce this desired result is illustrated. It is seen that a vertical brace member 75 has its bottom surface secured to adjustable plate 22. It has a plurality of pins 76 extending horizontally from one of its faces and over these coil springs 77 are positioned. Coil springs 77 have their opposite ends seated in recesses 78 and 79 of vertical brace member 75 and of pressure blocks 80 respectively. The front of pressure blocks 80 have a recess 81 in which roller bearings 82 are positioned, and these in turn bear against plate 47. The use of a double tier of individual pressure blocks 80 each with their own roller bearing maintains balanced pressure against both the top and bottom of belt 33 during the casting operation. As previously described the platens 47 are secured on the outer faces of the chain 45 and 57 respectively. As seen in FIG. 3 a pouring chute 87 is positioned above sprue cavity 65 and runner cavity 67. The pouring chute would be connected to a pot of molten metal (not shown) which could be positioned within or behind the cover of the continuous casting machine. A window 13 in the top of the cover allows the casting operation to be continually monitored or observed.

Figure 5:
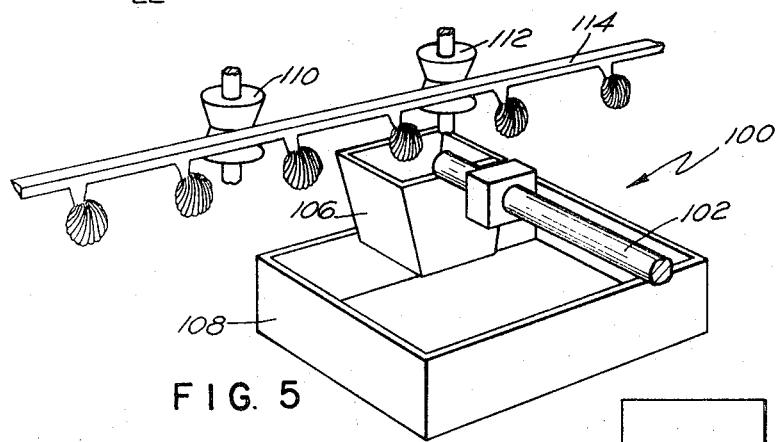
FIG. 5 is a partial perspective view of the auxiliary device for knocking the molded pieces off of the cast runner.
Figures 6, 7:
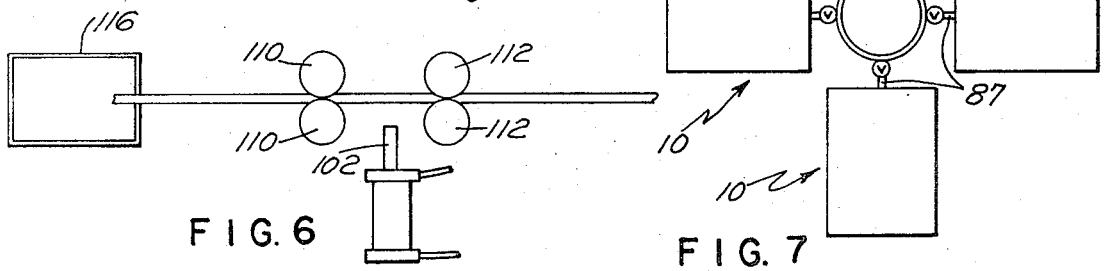
FIG. 6 is a partial top plan view of the auxiliary device for knocking the cast pieces off the cast runner.
FIG. 7 illustrates an alternative embodiment which utilizes a single melting pot to supply the molten metal for four continuous casting machines placed therearound it.

Since there is a runner cavity 67 connecting the individual sprue cavities, the cast pieces that have solidified at the exit end of the casting operation are ejected from the molds in the belts as one continuous piece of cast metal (see FIGS. 1 and 5). By use of an auxiliary unit 100 the individual cast pieces may be knocked or broken away from their sprue portion. At predetermined intervals a reciprocating piston rod would be caused to shoot forward breaking the cast individual pieces away from their sprue portions and allowing them to drop downwardly through hopper 106 into a container 108. Runner casting 114 passes through the auxiliary unit 100 between rollers 110 and 112 which supports the runner as the individual cast pieces are knocked from their sprue portions. The runner is then directed into scrap bin 116 and the scrap could be broken up and remelted again. Illustrated in FIG. 7 is an alternative continuous casting machine which utilizes four of the individual units 10. It has a central melting pot 120 with individual pouring chutes 87 connected to each of the units. In this manner a four machine cluster could be operated by a single workman.

What is claimed is:

1. A continuous casting machine comprising a stand, a first pair of laterally spaced shafts rotatably supported on said stand, said shafts being positioned parallel to each other and being vertically oriented, a first closed loop belt having a plurality of mold cavities formed in its outer face, a first conveyor means mounted on said first pair of laterally spaced shafts with said conveyor means supportably mounting said first closed loop belt so that it passes around said shafts, a second pair of laterally spaced shafts rotatably supported on said stand, said shafts being positioned parallel to each other and being vertically oriented, a second closed loop belt, a second conveyor means mounted on said second pair of laterally spaced shafts with said conveyor means supportably mounting said second closed loop belt so that it passes around said shafts, wherein said first conveyor means comprises sprocket gears mounted on said first pair of shafts and having a chain also passing around said sprocket gears, and wherein said chain has a plurality of pressure plates mounted on its outer face that contact the inner surface of said first closed loop belt, and wherein said first closed loop belt is made of elastic material, and wherein said mold cavities are connected to a plurality of sprue cavities that extend upwardly to the top of said belt and also said sprue cavities are connected to each other by runner cavities thereby allowing multiple pieces to be cast in a continuous piece of molded material, and wherein said stand comprises a stationary plate in which said first pair of laterally spaced shafts are rotatably supported and an adjustable plate in which said second pair of laterally spaced shafts are rotatably supported for varying the lateral spacing between said stationary plate and said adjustable plate.

2. A continuous molding machine as recited in claim 1 further comprising a cover that encloses said first and second closed loop conveyor means.

* * * * *